United States Patent [19]

Closs et al.

[11] 3,796,835

[45] Mar. 12, 1974

[54] SWITCHING SYSTEM FOR TDM DATA WHICH INDUCES AN ASYNCHRONOUS SUBMULTIPLEX CHANNEL

[75] Inventors: Felix Hugo Closs, Adliswil; Hans Rudolf Mueller; Erich Port, both of Rueschlikon; Harry Rudin, Jr., Thalwil; Daniel Wild, Adliswil, all of Switzerland

[73] Assignee: International Business Machines Corporation, Armonk, N.Y.

[22] Filed: Sept. 3, 1971

[21] Appl. No.: 177,737

[30] Foreign Application Priority Data

Sept. 30, 1970 Switzerland ........................ 14474/70

[52] U.S. Cl. ...... 179/15 BY, 179/15 A, 179/15 AL, 179/15 AT, 179/15 BA

[51] Int. Cl. ............................................. H04j 3/00

[58] Field of Search ....... 179/15 BA, 15 AF, 15 AL, 179/15 BY, 15 A, 15 AT; 178/50

[56] References Cited

UNITED STATES PATENTS

| | | | |
|---|---|---|---|
| 3,544,976 | 12/1970 | Collins | 179/15 AL |
| 3,627,951 | 12/1971 | Batin | 179/15 BA |
| 3,663,760 | 5/1972 | DeWitt | 179/15 BA |
| 3,564,144 | 2/1971 | Diggelmann | 179/15 BY |
| 2,676,202 | 4/1954 | Filipowsky | 325/40 |
| 3,646,223 | 2/1972 | Nadir | 179/15 BA |
| 3,535,450 | 10/1970 | Vollmeyer | 179/15 BA |
| 3,632,882 | 1/1972 | Ciecierski | 179/15 BA |
| 3,639,693 | 1/1972 | Bartlett | 179/15 A |

*Primary Examiner*—Kathleen H. Claffy
*Assistant Examiner*—David L. Steward
*Attorney, Agent, or Firm*—John A. Jordan

[57] ABSTRACT

A TDM multiplex communications system for effectively transmitting voice, or high speed, and signalling information or low speed data, between a plurality of stations by employing an asynchronous sub-multiplex channel for the low speed data transmission. The submultiplex channel comprises one or more time slots of the equally divided time slot intervals of the normal multiplexing time frame, and is available for use by any connected station of the incoming highways to the central switch, having signaling information or low speed data ready for transmission. Each of the connected stations of the incoming highways having voice or high speed data is assigned, for synchronous operation, particular ones of the remaining time slots, in cyclic fashion, within the multiplexing time frame. Since the submultiplex channel is arranged so that the sending or receiving station address is carried beside the data to be transmitted, any data rate is acceptable thereby.

5 Claims, 9 Drawing Figures

INVENTORS
FELIX H. CLOSS
HANS R. MULLER
ERICH PORT
HARRY RUDIN, JR.
DANIEL WILD

BY John A. Jordan
ATTORNEY

A= CHANNEL FOR LOW SPEED DATA OR FOR SIGNALLING
B= CHANNELS FOR HIGH SPEED DATA OR FOR VOICE(CODED)

SWITCHING SYSTEM FOR TDM DATA WHICH INDUCES AN ASYNCHRONOUS SUBMULTIPLEX CHANNEL

BACKGROUND OF THE INVENTION

The present invention relates to a method of time division multiplex communication, and to a switching unit which is suitable for a system to operate this method.

In time division multiplex communication, a number of channels are realized on a single line by assigning, in cyclic repeating time segments which are called time frames, to each channel a short subsegment of each frame, called a time slot.

The simplest method of establishing a connection between two terminals is to assign the same channel (the i-th time slot in each time frame) to both of them; both terminals are, accordingly, connected temporarily to the line each time during the assigned time slot by control and sampling devices. In more complex systems with a central exchange, different time slots are assigned to both terminals for a connection. The exchange effects the shifting from one time slot (incoming line) to another time slot (outgoing line).

For telephone connections, i.e., for speech transmission, a fixed channel assignment for the duration of a connection is reasonable because of the constant sampling rate of for example, 8 kc. In data transmission, however, a fixedly assigned channel is not utilized effectively if the data are sent irregularly or at a low repetition rate. It has already been suggested to transmit such data over a telephone channel during speech interrupts. This requires, however, complicated evaluation and switching processes.

It is therefore an object of the present invention to provide an improvement in the above mentioned state of affairs, and to disclose a method and apparatus which allows optimum utilization of existing equipment and line capacity for the transmission of data which are generated with rather large idle time intervals, at different bit rates, or irregularly as well as to allow the simultaneous operation of a much larger number of terminals than up to now practical.

In known communication systems, signaling information such as, for example, requests for connection, terminal numbers, receipt signals, etc., must also be transmitted. This kind of information represents generally only a small part of the total information to be transmitted and, therefore, in many time division multiplex systems it is transmitted distributed, for example, by adding one signaling bit per time slot, or by using each n-th time slot in a channel for the signaling information. This requires special distributing and assembling processes or devices. In addition, the transmission of signaling information in accordance with such an arrangement, is spread over a longer time interval than necessary.

It is therefore a further object of the present invention to provide a method and apparatus which allows for a speedy and simple transmission of signaling information, in the form of complete data units, using a minimum of transmission capacity.

It is yet a further object of the present invention to provide a combined solution to the above two mentioned problems, in a simple and effective manner.

In accordance with the principles of the present invention, a method and apparatus for time division multiplex communication is provided in which the signals on the lines are structured in time frames, each with a certain number of time slots, and which is characterized by the fact that at least one certain time slot of each time frame is used as a sub-multiplex channel, part of this sub-multiplex channel serving for the transmission of an address, in order to assign it to a terminal during the respective time frame, and the other part of the sub-multiplex channel serving for the transmission of data to be sent to or from the terminal. Time slots not part of the sub-multiplex channel are assigned individually or in groups, each to a terminal during a connection. In addition, a switching unit is provided which is suitable for a communication system operating according to this method.

The switching unit, in accordance with the present invention, is characterized by the fact that means for the separation and intermediate storage of data units from sub-multiplex channel time slots are provided in such a way that the data units from all time slots of a sub-multiplex channel of one input line, belonging to the same time frame, are available on intermediate lines each time after receiving the last one of such time slots.

The foregoing and other objects, features and advantages of the invention will be apparent from the following more particular description of the preferred embodiments of the invention as illustrated in the accompanying drawings.

DETAILED DESCRIPTION OF THE DRAWING

Figure 1:
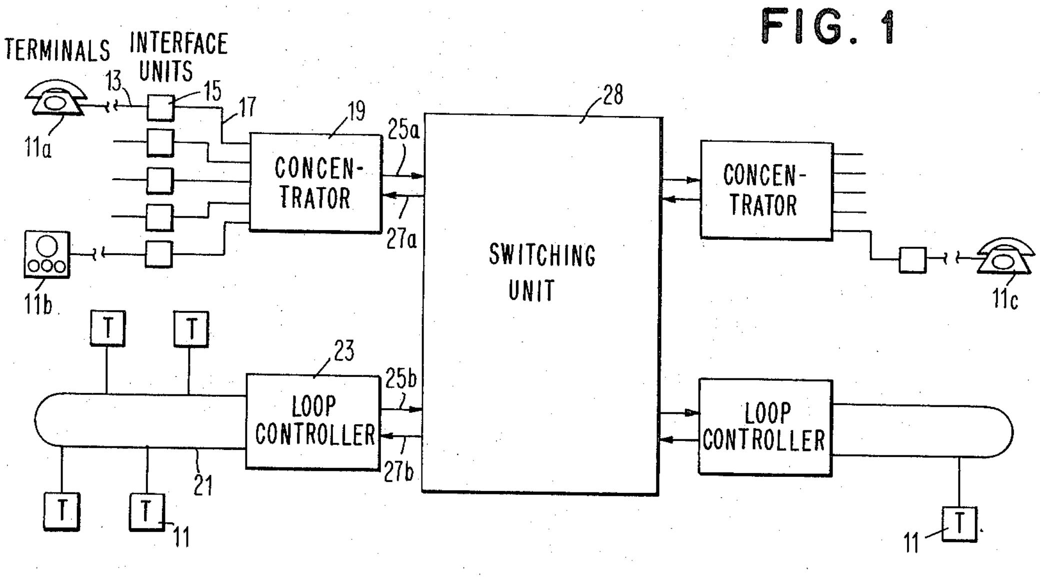
FIG. 1 shows a general representation of a time division multiplex communication system.

In FIG. 1 there is shown schematically a communication system comprising a time division multiplex switch in which the method and apparatus of the present invention may be utilized. The system includes a number of user devices or terminals 11 which can be connected in pairs, for exchanging messages. For example, two telephone sets 11*a* and 11*c* and a display device with keyboard 11*b* are shown. It is clear that any of a variety of other types of devices can likewise be connected. For example, a teletypewriter, punch card reader or even a complete data processing system may be connected.

Two possibilities are shown in FIG. 1 for connecting the terminals with the central station. In one case, each terminal can be connected, via a line pair 13, with an interface unit 15 in the central station. All interface units 15 belonging to one group are connected via lines 17 to a concentrator 19 for combining the signals of lines 17, in time division multiplex, on a line 25*a* for further transmission, and for distributing the incoming signals, in time division multiplex, on line 27*a* to the individual lines of the terminals. Concentrator 19 may have the form of a loop, over the whole length of which the connecting points for the individual lines 17 are distributed. These connecting points or the interface units 15, then have gating circuits which are opened regularly, at appropriate times, to effect sampling.

Another possibility for connecting the terminals 11 to the central station is shown in FIG. 1, in the lower portion on both the left and right sides thereof. In this case, no individual lines are provided but rather a long line loop 21 passing the locations of all terminals is employed. A loop controller 23 effects a time division multiplex combination of the messages from all the terminals T on loop 21. Lines 25*b* and 27*b* are quasi the end of this loop.

The switching unit 28 has the task of establishing connections between pairs of terminals. The signals arriving from a terminal on an incoming highway 25 (e.g., highway 25*a* for the telephone set 11*a*) are intermediately stored in the switching unit in a certain location and are released at an appropriate time on an outgoing highway 27 (e.g., highway 27*b* for the terminal 11 on loop 21). The switching unit effects a time assignment (time division multiplex) and a spatial assignment (space division multiplex). Because the different data terminals can send or receive data at quite different rate, the switching unit must necessarily be flexible in this respect.

Figure 2:
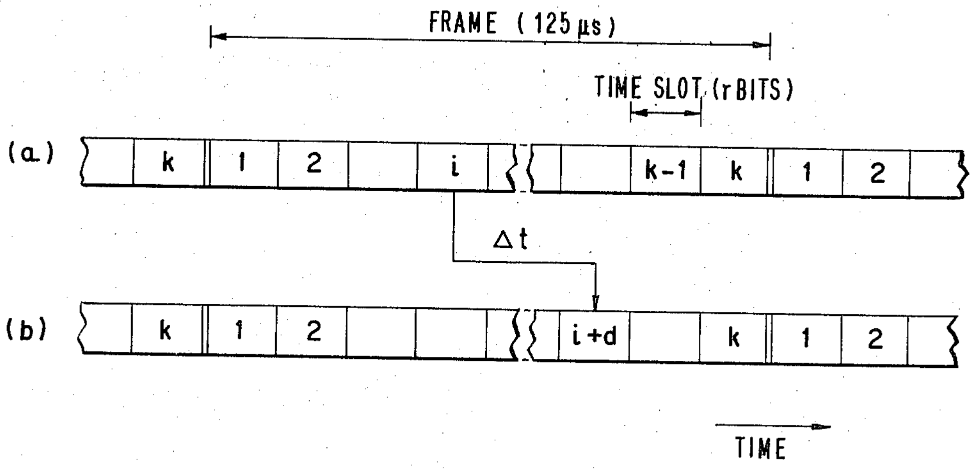
FIG. 2 depicts a representation of a time frame structure, to be used in the description of the time division multiplex communication arrangement shown in FIG. 1.

As an introduction to the explanation of the invention, the principles involved in time division multiplex communication will first be described, in connection with FIG. 2. With reference to FIG. 2, the signals appear on the lines in sequential frames of equal duration, as for example 125 $\mu$s. Each frame is divided into $k$ time slots, each of which includes $r$ bits (e.g., eight bits). Each time slot represents a communication channel, and the information of a given terminal always appears in sequential frames in the same time slot position. A time slot may be occupied either by a sampling value of an analog signal (e.g., speech signal) in coded form, or in data transmission, by one character (byte) of eight bits. For parity checking one parity bit may be added to each byte so that in each time slot $r = 9$ bits must be transmitted.

It is the task of the switching unit to take the information received from a sending terminal in a certain time slot i on an input line (shown at a in FIG. 2), and allocate it to a time slot $i+d$, which is assigned to the receiver on an outgoing line (shown at b in FIG. 2). During the time interval $\Delta t$ the information must be delayed or stored. For simplicity reasons the frames are shown in FIG. 2 as if their beginnings were coincident. In general, this is not the case. When a phase displacement exists between the time frames, the assignment between time slots $i$ and $i+d$ must be preserved, of course. Only the time duration of interval $\Delta t$ is then changed.

In existing time division multiplex communication systems, a time slot or channel is fixedly assigned to each terminal, as has been described. This is necessary when speech or high-speed data are to be transmitted. In these cases, one time slot position always carries, in sequential frames, different information. If, however, the data to be transmitted are generated at a low rate, as for example in teletypewriters, information is transmitted in only a few of the assigned time slots, whereas the others are not effectively utilized. During transmission of signaling information, as for example when a request for establishment of a connection or a calling signal for a telephone call are sent, the capacity of lines and devices in the central station are also utilized ineffectively, if a complete channel is devoted to this purpose. If, however, as it is done in many existing systems, the signaling information is transmitted bitwise between the message units or in time slots which occasionally remain free, complex circuits or auxiliary programs (if control is done by data processing unit) are required.

The method and apparatus, in accordance with the principles of the present invention, allow a better and more flexible utilization of lines and equipment and, therefore, an increase in the communication capability of the complete system, as well as a much simplified treatment of the signaling information.

METHOD OF THE INVENTION

More particularly, the method of the present invention is based on the following principle: a number of the available time slots in sequential frames are always reserved for the transmission of low speed data or signaling information. These time slots act to provide a channel, designated A in FIG. 3, which is always available for all terminals at the respective lines, and which is occupied by a terminal only if this terminal actually has information to be transmitted. This special channel may be used by all terminals, in a kind of multiplex operation (sub-multiplex). All other channels (time slots), wich are designated B in FIG. 3, are used in the usual manner with fixed assignment for the transmission of speech or of high speed data.

Figure 3:
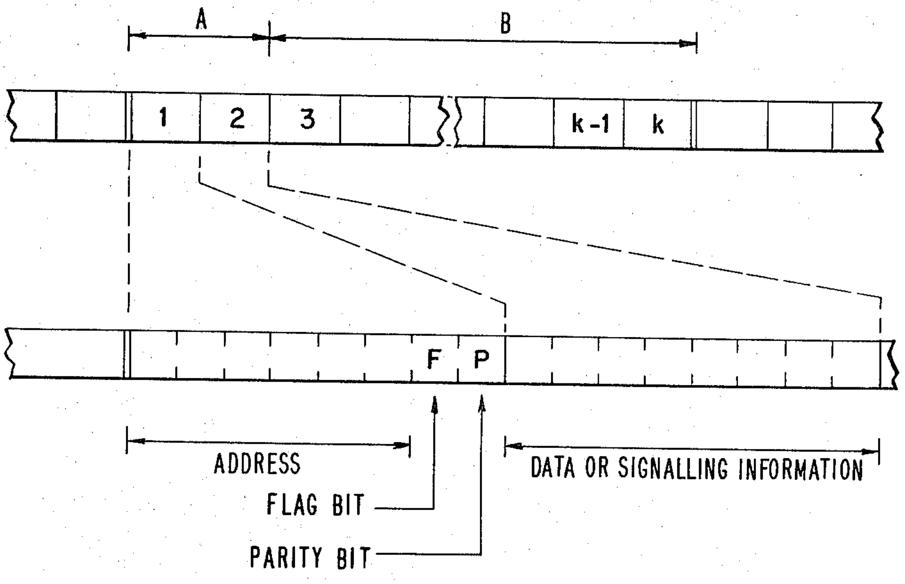
FIG. 3 depicts a representation of a time frame structure, to be used in the description of the method of the present invention.

In the particular embodiment of the method shown in FIG. 3, two time slots are used for channel A, to wit, one for the terminal address and the other for the information to be transmitted (data for another terminal or signaling information). The first time slot also receives a flag bit by which a distinction can be made between data and signaling information. In addition, as shown in FIG. 3, a parity bit may also be included in the first time slot, which bit may be included in all time slots for error checking. Instead of using the eighth bit, as shown here, a ninth bit could be attached as parity bit to all time slots. On the other hand, a redundant address code could be used for error checking, if more than the required minimum of address bits were used.

As long as channel A is not used, the address part in time slot 1 (the first six bits) contains an idle address, i.e. a certain code word which is sent to the line in the correct bit positions by the controller at the beginning of each frame. This enables the respective terminals, or their interface units, to recognize that channel A is still available. If a terminal wants to send signaling information to the central station or a single data byte to another terminal, it inserts its own address into the first time slot instead of the idle address. Flag bit and parity bit are inserted as required, and the information to be transmitted is sent to the line in the second time slot. Now, all other respective terminals or interface units can recognize that channel A is busy for this time slot, and the central station (switching unit) can determine from which terminal, on the respective line, information is received in the second time slot. If signaling information is transmitted, it is sent to the controller of the central station to be processed there.

If, however, data for another terminal are transmitted, the sender address received previously in the first time slot must be converted into the address of the receiving terminal. For this purpose, a table must be stored in the switching unit. The "existing connections" for low speed data transmission are registered in this table. The data arriving in the second time slot are sent together with the receiver address — within the preceding first time slot — to the corresponding output line of the switching unit. Each respective terminal or interface unit constantly monitors the addresses arriving on the line in the first time slot. When its own address appears it extracts the data out of the following second time slot. In the same manner, the controller of the switching unit can send signaling information through the special sub-multiplex channel (time slots 1 and 2) to any terminal by sending the address prior to the signaling information.

For distinguishing between free and busy states of the sub-multiplex channel, one or two additional status bits may be provided at the beginning of the first time slot, rather than using the idle address. This eliminates the delay which would be necessary for inserting its own address, after recognizing the idle address.

Except for the two time slots which are used for the sub-multiplex channel A, all other time slots (channels) are available for the transmission of high speed data or of coded speech signals so that the communication system may be utilized to its optimum.

It should be recognized that, in accordance with need, a frame structure departing from that described with reference to FIG. 3 may also be used. For example, more than two time slots may be used for channel A. In particular, three time slots may be used, one of which may be used for the address and two of which may be used for data or signaling information. In addition, one of the additional time slots may be used for control information which is to be sent from terminal to terminal together with the data. This makes it possible to connect complicated terminals to the system which otherwise would require additional control lines (e.g., display devices).

It should also be recognized that two special channels A1 and A2 could also be provided, if a relatively large amount of low speed data signaling information is to be transmitted. Each sub-multiplex channel would, in this case, comprise for example two time slots, i.e., one for addresses and the other for data or signaling information, as described above for the single sub-multiplex channel.

COMMUNICATION POSSIBILITIES WITH SUB-MULTIPLEX CHANNEL

The frame structure, in accordance with the preent invention, allows the low speed data terminals to send and receive at their own bit rate, i.e., to operate asynchronously. If six-bit addresses are used in the sub-multiplex channel, as suggested in the embodiment shown in FIG. 3. 64 terminals can be addressed per line, i.e., per group. If a frame duration of 125 $\mu$s is assumed, 64 k bit/s can be transmitted over the sub-multiplex channel (eight bits per frame. This means that 32 terminals can send data at a rate between 0 and 2 $k$ bit/s simultaneously. In addition to that, up to 30 terminals can transmit data or coded speech over the usual channels (each 64 $k$ bit/s) simultaneously. (One channel may be required for a frame-synchronization byte).

Signaling is made more effective by the bytewise transmission of the signaling information. This improved handling of signaling allows, if required, a more simple assignment of a plurality of time slots per frame to a single terminal which must transmit or receive large amounts of data in a short period of time (e.g., magnetic tape units).

Furthermore, an asymetric transmission is also possible, as for example in display devices from which a few requests of data are sent by a keyboard over the sub-multiplex channel to the central station, whereas the larger amount of data to be displayed are sent over a normal high speed channel to the display device.

APPARATUS OF THE INVENTION

Subsequently, there will be provided a description of an embodiment of a switching unit in accordance with the present invention, which can be used in connection with the communication method described. However, prior to that, a time division multiplex switch arrangement will be described in connection with FIG. 4 wherein, as heretofor was the practice, a fixed assignment between terminal and time slot (channel) exists during a connection, i.e., in which all available channels are used in the same manner.

Figure 4:
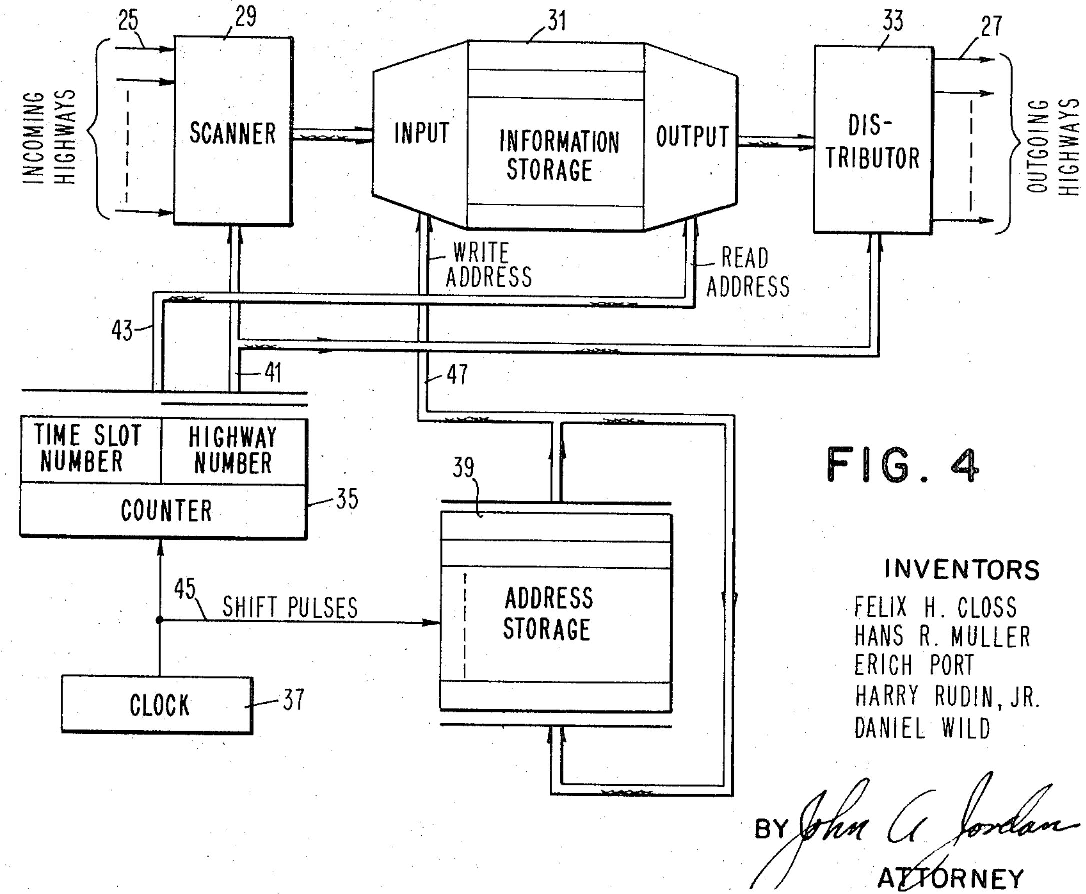
FIG. 4 shows a time division multiplex switching unit to be used in connection with background description for the switching unit of the present invention, shown in FIGS. 5A and 5B.

Corresponding to the designations used in FIG. 1, the incoming highways are designated 25 in FIG. 4, and the outgoing highways 27. One incoming highway and one outgoing highway are assigned to each group of terminals. These highways transmit signals from the terminals to the switch or from the switch to the terminals, respectively, in time division multiplex operation. A scanner 29 scans the incoming highways cyclically one after the other, and accepts at one time the signals of one time slot from one highway for input to information storage 31. The number of storage locations in this store is equal to the product of the number of highways (number of groups) and the number of time slots per frame. A distributor 33 transfers signals to the outgoing highways cyclically for each time slot one after the other, which are each read from a storage location of information storage 31.

The input of data units (time slot contents) into information storage 31 is made in an irregular assignment with the aid of an address table, in address storage 39. Read-out is made sequentially in a cyclic manner, one storage location after the other. To simplify the description for the exchange of FIG. 4, it is assumed that the frames on all incoming and outgoing highways are synchronized. This means that during one scanning cycle, time slots of the same number are received or sent out on all incoming and outgoing highways. The general case in which the frames on the incoming highways are not synchronized is considered in the embodiment of FIG. 5, described later on.

A counter 35, which is stepwise incremented by a clock 37, is provided for the control of scanner 29, distributor 33 and the storage operation in information storage 31. The clock is synchronized to the time slot rate of the multiplex signals on the incoming highways. During each time slot the counter runs through one sub-cycle, which corresponds to the number of incoming highways (lower part of the counter contents = highway number). During a frame the counter runs through a complete cycle, and the higher value part of the counter contents represents the time slot number.

The actual exchange, i.e., the association between incoming and outgoing highways and time slots assigned to two partners of a connection, is made with the aid of address storage 39 into which an address is inserted for each established connection by the control unit. Synchronously with the scanning of the incoming highways, the contents of address storage 39, which is a shift storage (e.g., parallel shifting registers), are shifted one storage location by each pulse from clock 37, on line 45. The information storage address, available at any time on output line 47 of the address storage, corresponds to the presently available time slot on the presently scanned highway. The data unit is not written into the storage location so identified. Its position corresponds to the time slot and the highway to which the data unit has to be transferred for transmission to the receiver. Read-out of information storage 31 can be effected sequentially and cyclically, with the reading address corresponding to the complete contents of the counter available on line 43. The contents of the information storage are once read out and completely renewed during each time frame, while the scanner cycles *k* times during this time interval, according to the number of time slots per frame.

The double lines in FIG. 4, as well as in all following figures, represent multiple lines (conductors) on which the required number of bits (e.g., eight bits for the data unit between scanner 29, information storage 31 and distributor 33) can be transmitted in parallel. The lines (conductors) represented in the drawing by a single line transmit only control pulses, or binary data, in sequential form (e.g., time division multiplex highways 25 and 27).

SWITCHING UNIT COMPRISING SUB-MULTIPLEX FACILITIES

In connection with FIGS. 5A and 5B, a time division multiplex switch will now be described which, in some respects, is analogous to the switch just described in FIG. 4, but which has been extended by additional apparatus in such a way as to make it suitable for use in accordance with the principles of the present invention. The additional apparatus, it will be clear, is used to separate respective addresses and data or signaling information which are received on the incoming highways during each first and second time slot, from the normal transmission and exchange circuits. Signaling information is transferred, together with the address of the sender, to the control unit for further processing. In the case where it is a data unit to be further transmitted, the address of the sender is exchanged against the assigned address of the receiver, and this new address, together with the data unit, are transferred to the correct outgoing highway during time slots 1 and 2. Furthermore, signaling information can be sent, via this additional apparatus, from the control unit over the special channel (time slots 1 and 2) to any of the terminals.

The double lines in FIG. 5 represent multiple lines (conductors) over which a plurality of bits are transmitted in parallel. Therefore, the AND-circuits to which these multiple lines are connected consist of a plurality of AND-gates which are all closed or opened simultaneously by the control signal applied to their second input.

Figure 5A:
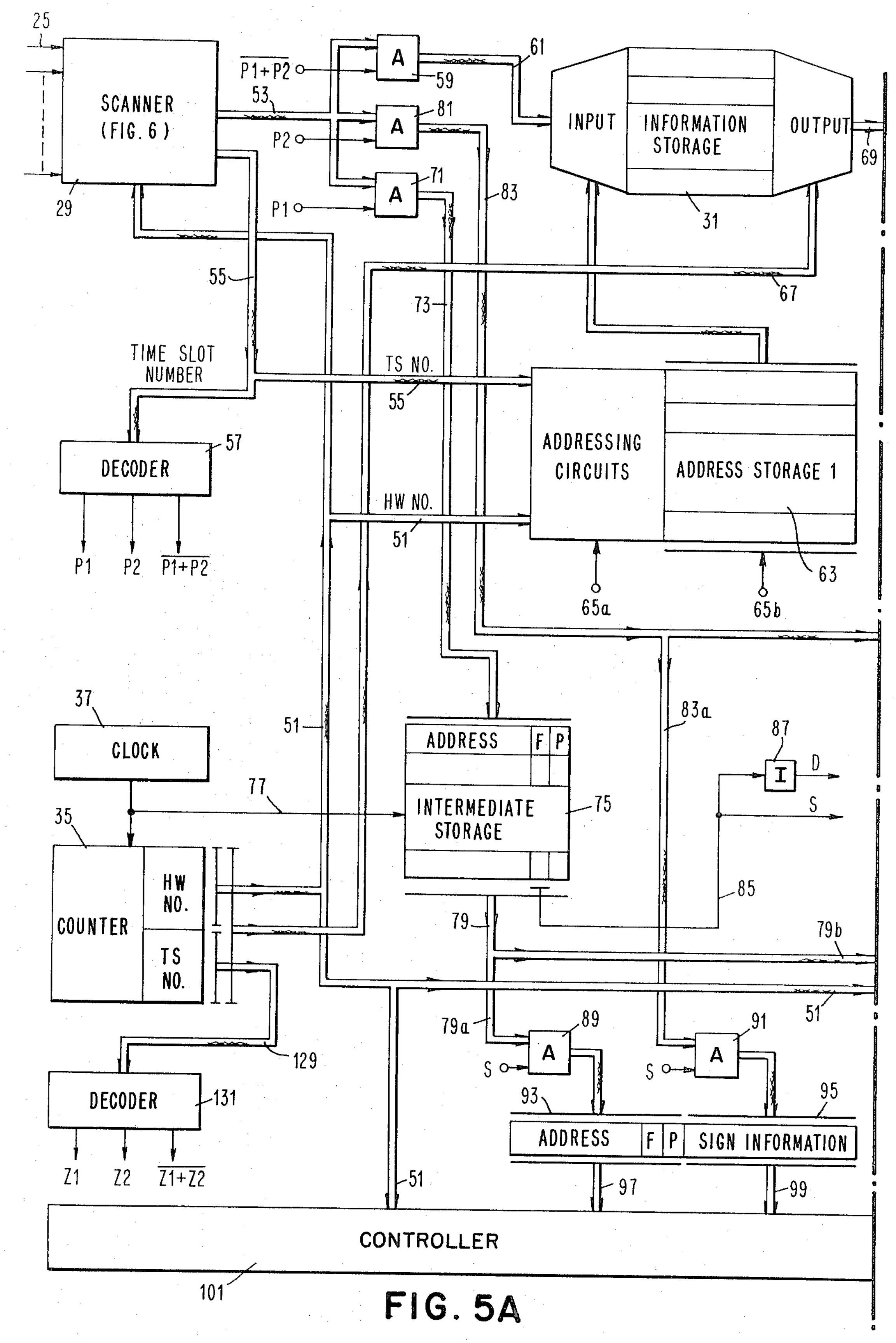
FIGS. 5A and 5B show the switching unit of the present invention, which switching unit may conveniently be employed in carrying out the communication method, in accordance with the present invention.
Figure 5B:
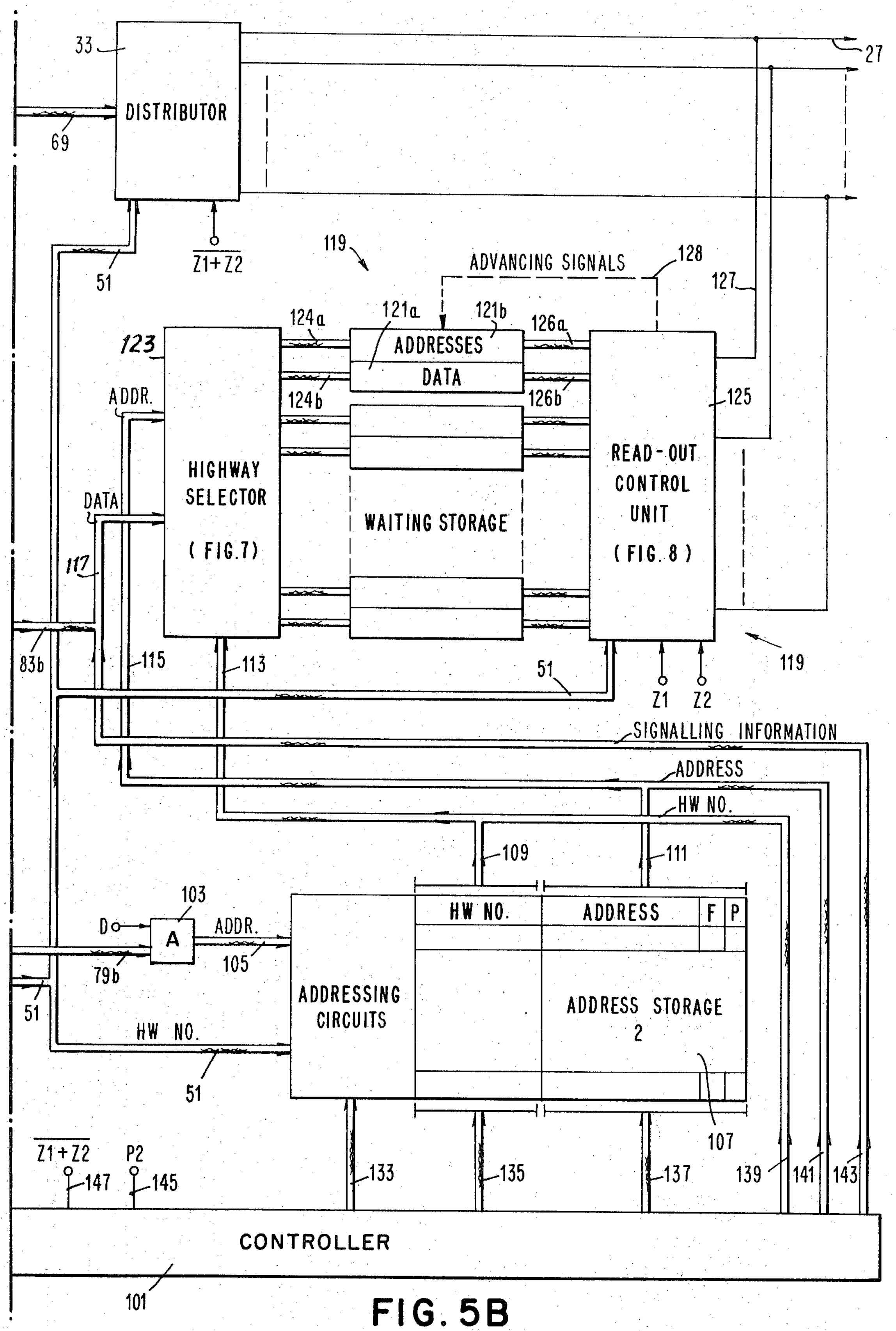

As in the simple switch arrangement described above in connection with FIG. 4, in the switch arrangement of FIGS. 5A and 5B a number of time division multiplex input highways 25 and output highways 27 are provided which are assigned in pairs, each to a group of terminals. A scanner 29 scans the input highways cyclically, one after the other. It can transfer one data unit (corresponding to one time slot) to information storage 31 where it is stored in a predetermined order, not corresponding to the input but to the output sequence. The data units are read out in sequential order and transferred through distributor 33 (FIG. 5B) to the output highways at the appropriate time.

A counter 35, provided for time control, is also shown in the switch arrangement of FIGS. 5A and 5B, which counter is stepwise incremented by a clock 37. One part of the counter output value (the lower one) is transferred as highway numbr over line 51 for addressing and time control to different other parts of the switch, among these to scanner 29.

In contrast to the switch described in FIG. 4, it is assumed in FIGS. 5A and 5B that the frames of the incoming highways are not synchronized. This means, for example, that in one scanning cycle by scanner 29, time slots ZS8 (highway No. 1) ZS 15 (highway No. 2), ZS 1 (highway No. 3), ZS 23 (highway No. 4), etc., are received on sequential highways. Therefore, a separate counter must be provided in the scanner for each highway, which furnishes the current time slot number for the corresponding highway, and which is reset to "1" at the end of each frame. The scanner 29 is shown in more detail in FIG. 6.

The scanner 29 in FIG. 5A furnishes on its output line 53 the data unit just scanned (one time slot from one highwaY) and, in addition, on line 55 the current time slot number of the highway just scanned. This number is decoded in a decoder 57 in order to determine whether the first (P1), the second (P2) or one of the other time slots ($\overline{P1 + P2}$) were involved.

If the data was taken from one of the time slots 3 . . . *k* (i.e., it represented either coded speech or high speed data for which there is a cyclic exchange) it will be sent, due to the signal $\overline{P1 + P2}$, through AND-circuit 59 over line 61, to the input of information storage 31. The location whre this data unit is to be stored is determined by an address from address storage 1, designated 63 in FIG. 5A. Address storage 1 contains for all existing connections a table of assignment between sending terminal, which is represented by the highway number on line 51 and the time slot number on line 55, and the receiving terminal, which is determined by an outgoing highway and time slot number, and to which a certain location of storage 31 is fixedly assigned. To establish new connections, the contents of address storage 1 can be changed by the controller, over input 65*b*, while addressing is effected over input 65*a*.

Data units are read out sequentially and cyclically from information storage 31 with the aid of the highway and time slot numbers from counter 35, which numbers are transferred over line 67 as reading address to information storage 31. The output of information storage 31 is transferred over line 69 and distributor 33, which is also controlled over line 51 by the highway number from counter 35.

SEPARATION OF INFORMATION FROM THE SUB-MULTIPLEX CHANNEL

If the data unit which was last received and transferred to line 53 (FIG. 5A) was taken from a time slot 1, and is therefor a sender-address, it will be transferred, due to a control signal P1, over AND-circuit 71 and line 73 into an intermediate storage 75. The intermediate storage 75 is a shifting storage, which, for example, may consist of eight parallel shift registers. Its contents are shifted synchronously with the cycling of scanner 29 by shifting pulses on line 77 from clock 37. The capacity of intermediate storage 75 is so designed that it effects a delay of exactly one time slot duration. Therefore, an address which was taken from the first time slot of the i-th incoming highway appears at the output on line 79 when, at the output of scanner 29, the signaling information (or data unit, respectively), which follows the address of the sender, appears in the second time slot on the i-th incoming highway.

At this moment, signal P2 appears at the output of the decoder and has the effect that the data unit from line 53 is transferred, over AND-circuit 81, to line 83. Thus, the address of the sender (time slot 1) and the corresponding data uit (time slot 2), transmitted over a sub-multiplex channel, appear simultaneously on lines 79 and 83. In addition, on the output line 85 of intermediate storage 75 the corresponding flag bit is available (singal "S"), which flag bit indicates whether the data are signaling information or data to be further transmitted.

SIGNALING INFORMATION

If the data unit in question represents signaling information, the sender addrss is read into register 93 over line 79*a* and AND-circuit 89, and the signaling information itself is read into register 95 over line 83*a* and AND-circuit 91. The register contents are transferred over lines 97 and 99 into the switch controller 101 for further processing. The address on line 97, which allows only a distinction between terminals within one group (on one multiplex highway) is amended by the highway number which is furnished over line 51 to the controller. The controller can now initiate the processes required by the signaling information. For the transmission of this signaling information, the sub-multiplex channel of the respective highway was only occupied during one frame.

DATA EXCHANGE BETWEEN TWO TERMINALS

If the information present on line 83 represents data to be further transmitted to a receiving terminal, this is indicated by a control signal "D" which is generated from the flag bit on line 85 by an inverter 87. In this case the sender-address is sent from line 79 over line 79*b*, AND-circuit 103 (FIG. 5B) and line 105 to the addressing circuits of an address storage 2, designated 107 in FIG. 5B. This storage contains the assignment list between pairs of terminals which are "connected" over the sub-multiplex channel, at any time. In connection with the highway number on line 51, the sender-address selects the storage location, in address storage 2, at which the assigned receiver-address is stored. This address is furnished in the form of a highway number on output line 109, and a terminal number on output line 111. The address of the receiving terminal and the corresponding data must now be stored in a waiting storage arrangement 119. The reason for this is the following: During one frame interval, data may arrive on two or more different incoming highways for the sub-multiplex channel of one and the same outgoing highway. Because in the embodiment shown only two time slots are available per frame for the transmission of addresses and data in the sub-multiplex channel, the data of only one incoming highway could be handled in such a case without waiting storage whereas the other data would be lost.

The waiting storage arrangement 119 consists of the waiting storages 121, in which one pair of waiting stores 121*a* and 121*b* are provided for each outgoing highway, and of a highway selector 123 for selection of one pair of waiting stores at any time. In addition, the arrangement includes read-out control unit 125 which can transfer the contents of the waiting stores 121 to output lines 127, connected to the outgoing highways 27 of the switching unit. The highway selector and the read-out control unit are described in more detail in connection with FIG. 7 and FIG. 8.

The highway number present on line 109 in FIG. 5B controls, over line 113, the highway selector 123 in such a way that it transfers the receiver-address and corresponding data unit in parallel to that pair of waiting stores 121*a* and 121*b*, which correspond to the desired outgoing highway. The receiver-address is furnished to highway selector 123 from line 111, over line 115, and the corresponding data unit is furnished to highway selector 123 from line 83, over line 83*b* and line 117.

Each waiting store 121 is so designed that the data unit which was stored in it for the longest time is available at the ouput. Newly furnished data units get a position at the end of the existing waiting queue, which queue is shifted one position by advancing signals, in the direction of the storage output, after each extraction of a data unit, shown at 128. Storage units for such a function are known in the art and are, therefore, not described herein im more detail. If required, waiting stores having a priority function could be used so that not the oldest, but rather the data with the next priority level (e.g., signaling information) is read out.

The extraction of data from waiting storage 121 in FIG. 5B and their transmission over the sub-multiplex channels (time slots 1 and 2) of the outgoing highways is effected by read-out control unit 125. This unit serves the output lines cyclically one after the other and, therefore, receives as a control signal on line 51, the current highway number from counter 35, as shown in FIG. 5A. The time slot number from counter 35 is transferred over line 129 to decoder 131. The output signals of this decoder determine whether the first (Z1), the second (Z2) or any other time slot $\overline{(Z1+Z2)}$ are present on the outgoing highways. Signals Z1 and Z2 are transferred to read-out control unit 125, enabling it to first read out, during the first time slot, one address from each of the waiting stores 121*a*, one after the other to each of the output lines 127. Then, during time slot 2, one data unit from each of the waiting stores 121*b* is read out to the output lines so that the address of the receiving terminal and the corresponding data unit, which were stored in parallel, appear sequentially on the outgoing highway in succeeding time slots 1 and 2. Distributor 33 receives the signal $\overline{Z1+Z2}$ so that it furnishes high speed data or coded speech only during the other time slots, and not during the time slots which are assigned to the sub-multiplex channel.

For establishing sub-multiplex channel connections, controller 101 can access address storage 107 over line 133 by a sender address, and then furnish the desired receiver-address for input on lines 135 and 137.

The waiting storage arrangement 119 in FIG. 5B also serves to send signaling information from the switching unit over the sub-multiplex channel to any terminal. In order to do this, the controller furnishes on lines 139, 141 and 143 the desired highway number, the terminal address and the signaling information, respectively. Address and signaling information are transferred to the correct pair of waiting stores 121*a* and 121*b* through highway selector 123, in the same manner as described above, and the stores will be released at the appropriate time on the corresponding highway.

Control signals P2 (from decoder 57 in FIG. 5A) and $\overline{Z1 + Z2}$ (from decoder 131 in FIG. 5A) are sent to controller 101 by input lines 145 and 147, as shown in FIG. 5B. These signals are sent to the controller so that the controller transfers any information into address storage 2 (107) or into the waiting storage arrangement 119 only at times when they are not receiving signals from the incoming highways (P2), or applying signals to the outgoing highways (Z1 + Z2).

SCANNER

Figure 6:
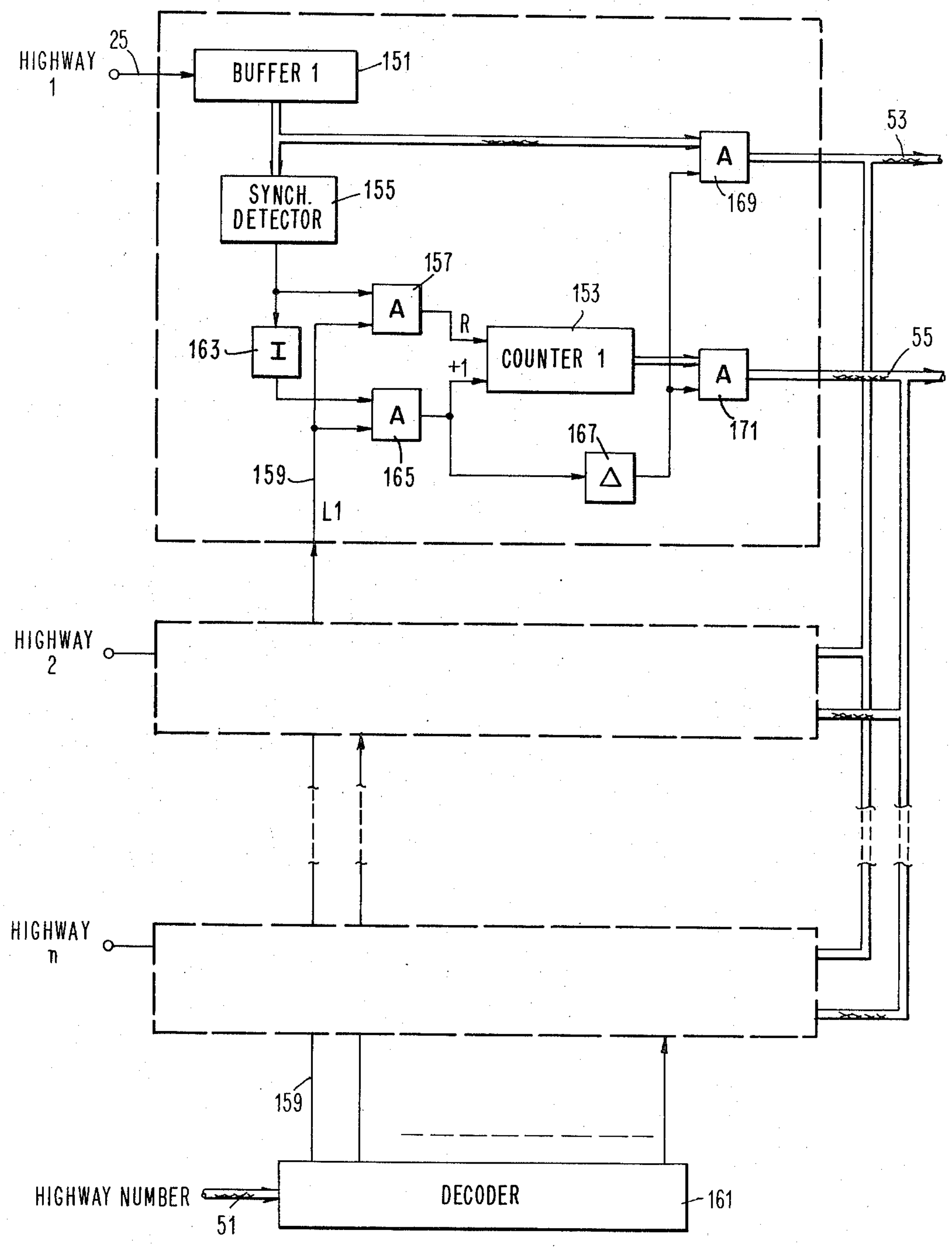
FIGS. 6 to 8 show the circuit details of the switching unit according to FIGS. 5A and 5B.

Scanner 29, in FIG. 5A, is shown in more detail in FIG. 6. Inputs to the scanner are *n* time division multiplex incoming highways 25, and also bus line 51 on which the current highway number is transferred from the counter. The scanner has two output bus lines 53 and 55 carrying the data unit just scanned and the corresponding time slot number of the respective highway.

For each input line, a buffer circuit 151 is provided which receives the bits of one data unit (one time slot) sequentially and releases them in parallel. This buffer circuit may coonsist of two parallel registers, the first of which collects, as a shifting register, the sequential bits and transfers them in parallel to the second register whre they can be accessed during one time slot duration. Such arrangements, and the necessary synchronizing circuits, are known in the art and are, therefore, not described here in more detail.

A counter 153 giving the current time slot number is also provided for each incoming highway. A synchronizing detector 155 generates a control signal when the buffer contains the synchronizing bit sequence which indicates he beginning of a frame. This control signal can reset time slot counter 153 to "0," via AND-gate 157. Resetting is effected, however, only if on line 159 (the second input to AND-gate 157) a control signal "L1" is present. This latter signal is generated by decoder 161 which receives on line 51 the current highway number, and which furnishes at any time, on one of its output lines 159, a highway control signal (L1 . . . Ln). During one time slot, all output lines of the decoder are activated once so that all incoming highways are scanned once during this time.

The control signal "L1" on line 159 advances, via AND-gate 165, counter 153 by one unit in each subsequent scanning cycle. At the beginning of the frame the advancing is inhibited by AND-gate 165 due to an inhibition signal from inverter 163 which is connected to the output of synchronizing detector 155. The advancing signal from AND-gate 165 is also used as a control signal for releasing the contents of the buffer and of the counter. This signal is, however, delayed by a delay element 167 so that counter 153 has enough time to change to the new counting value.

An AND-circuit 169, which is connected to the output bus line of buffer circuit 151, gates the contents of the buffer to the output bus line 53 when the control signal is present. AND-circuit 171, which is connected to the parallel output of counter 153, gates the counter contents to bus line 55 when the control signal is present.

It is clear that the scanning units at the other incoming highways (L2 . . . Ln) have the same design as the one just described for incoming highway 1.

HIGHWAY SELECTOR

Figure 7:
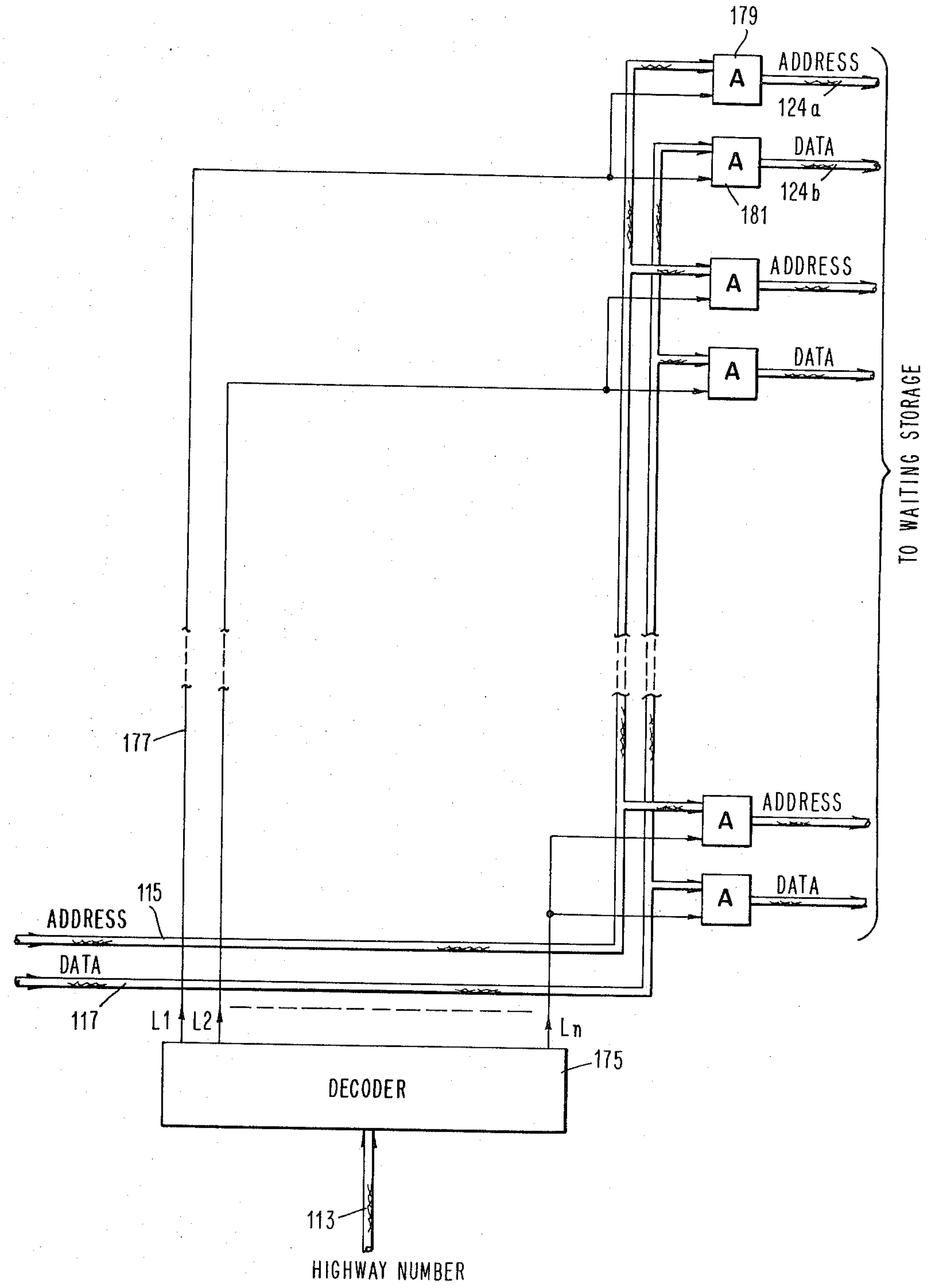

Highway selector 123 of FIG. 5B is shown in more detail in FIG. 7. Its input lines are two bus lines 115 and 117 for addresses and data. The highway selector has n pairs of output bus lines 124*a* and 124*b* for addresses or data respectively, each of which is connected to a waiting store (121*a* or 121*b* respectively in FIG. 5B).

Bus line 113 transfers the highway number of the terminal to be addressed from address storage 2 (107 in FIG. 2) to a decoder 175, so that the decoder furnishes, at any time on one of its output line 117, a control signal (L1 . . . Ln). Pairs of AND-circuits 179 and 181, the inputs of which are connected to the lines 115 or 117, respectively, gate the signals from the input lines to one pair of the output lines, depending on the current highway control signal (L1 . . . Ln).

READ-OUT CONTROL UNIT

Figure 8:
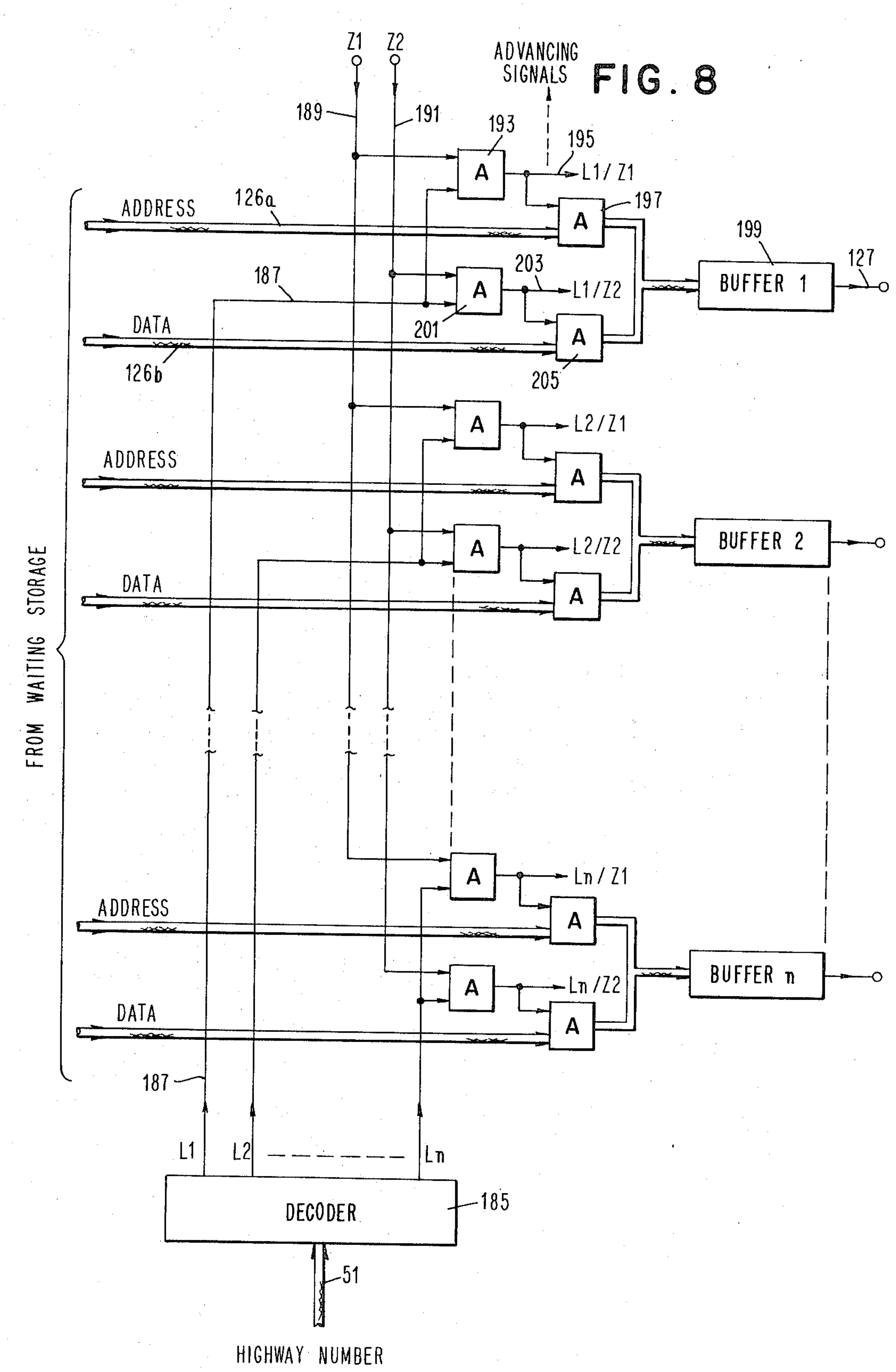

The details of read-out control unit 125 in FIG. 5B are shown in FIG. 8. This unit reads data cyclically from waiting stores 121 in FIG. 5B for transfer to the output lines 127. During one cycle (time slot 1), it reads out one data unit on lines 126*a* from each address waiting store 121*a*, and during another cycle (time slot 2) it reads out one data unit on lines 126*b* from each of the data waiting stores 121*b*.

For controlling these read-out operations, advancing signals Li/Lz are generated in the following way: a decoder 185, which receives on its input line 51 the current highway number, furnishes on any one of its *n* output lines 187 a highway control signal (L1 . . . Ln). The single input lines 189 and 191 receive time slot time signals Z1 or Z2 respectively from decoder 131. These two signals correspond to the first (addresses) or to the second (data) read-out cycle respectively. By combining in pairs all highway control signals Li with the time slot time signals Z1 in AND-gates 193 and with the time slot time signal Z2 in the AND- gates 201, advancing signals L1/Z1, L1/Z2, etc., are generated on lines 195 or 203, respectively. Each of these signals is transferred to the corresponding waiting store (121*a* or 121*b* respectively) so that it releases one data unit and shifts its contents by one position.

For gating the addresses from bus lines 126*a* and the data from bus lines 126*b* to the output lines, AND-circuits are provided to which the advancing signals Li/Zi are applied as releasing signals. Buffer arrangements 199 are provided for the output lines They receive addresses or data respectively on the input bus line and transfer these sequentially to the time multiplex output lines 127. Because such buffer arrangements and the necessary timing circuitry are known in the art, they are not described here in detail.

To summarize, each of the buffers 1 to n is filled once in each frame during the first time slot and then once again during time slot 2. The signals on outgoing highways 27 have, of course, a time shift of one time slot due to the parallel to series conversion (analogously, a time shift of one time slot is introduced at the input side of the switching unit).

In the circuitry of FIGS. 6 and 8, one decoder is provided which decodes the highway number transferred on one bus line (51) into individual signals (L1 . . . Ln) on signal control lines. It would be possible, of course, to generae signals L1 . . . Ln by a single coder on the highway number output of counter 35. Alternatively, a ring counter having n output taps could be provided. In this case some decoders would be saved. However, n lines (instead of 1dn) would have to be provided for all circuits using the highway number from counter 35.

MODULAR CONSTRUCTION

The described switching unit for n incoming and outgoing highways, i.e., for n groups of terminals, may be built in a modular manner by providing for each highway (each group), one exchange module.

In this case, all storage circuits would be reduced to the n-th part. For example, each module would need only one pair of waiting stores (121*a* and 121*b* in FIG. 5B). The input scanner and output distributor would not be necessary for the individual modules. Instead of that, input and output gating circuits, as well as some bus lines for the interconnection of the modules, would be required. The highway numbers, which would then no longer be necessary within a group (a module) for addressing, would then control these gating circuits for transferring addresses or data respectively from one module to the other. A system could then be built of just as many exchange modules as required for the existing number of terminals, within a given maximum capacity.

What is claimed is:

1. A communication switching device for controlling and switching both high speed and low speed data between a plurality of incoming and outgoing highways, each of said highways comprising a plurality of stations connected to said switching device and arranged to transmit data in time frames divided into time slots with the low speed data ready for transmission from any of said connected stations having available for asynchronous occupancy with its associated address information at least one designated time slot assigned to low speed data transmission so as to form asynchronous sub-multiplex channel therefor and with the high speed data from said connected stations occupying the remainder of said time slots of said time frames in accordance with the assignment of designated time slots to particular stations so as to form a synchronous multiplex channel therefor, said switching device including:

scanning means to scan every incoming highway during each time slot of each time frame to obtain the information received therein;

selection means coupled to said scanning means for selecting information including said address information and said low speed data received during time slots assigned to said sub-multiplex channel during each time frame;

intermediate storage means coupled to said selection means for storing any sending station address information received on said sub-multiplex channel during each time frame;

control means responsive to the said information received on said sub-multiplex channel for determining whether the said low speed data received over said sub-multiplex channel is signaling information or data to be sent to another station;

address storage means coupled to said intermediate storage means and to said control means and having stored therein an assignment list which identifies the address relationship between respective pairs of sending and receiving stations which are connected over said sub-multiplex channel, said address storage means being responsive to the said sending station address stored in said intermediate storage means and to said control means to produce at its output the address of the receiving station to which said sending station is connected; and outgoing highway selection and control means coupled to each of said address storage means, said selection means and said control means and responsive to select the appropriate one of outgoing highways in accordance with the respective receiving station addresses received from said address storage means, said receiving station addresses corresponding to the receiving stations identified by said assignment list as the one to which respective ones of said sending stations is connected, said outgoing highway selection and control means acting to store said receiving station addresses and the associated said low speed data to be sent therewith to said receiving stations as received from said selection means and said control means.

2. A communicatin switching device for controlling and switching both high speed and low speed data between a plurality of incoming and outgoing highways, each of said highways comprising a plurality of stations connected to said switching device and arranged to transmit data in time frames divided into time slots with the low speed data ready for transmission from any of said connected stations havng available for asynchronous occupancy with its associated address information at least one designated time slot assigned to low speed data transmision so as to form an asynchronous sub-multiplex channel therefor and with the high speed data from said connected stations occupying the remainder of said time slots of said time frames in accordance with the assignment of designated time slots to particular stations so as to form a synchronous multiplex channel therefor, said switching device including;

scanning means to scan each incoming highway during each time slot of each time frame to obtain the information received therein;

separating means coupled to said scanning means for separating information including separating said low speed data and associated sending station address information received during time slots assigned to said asynchronous sub-multiplex channel during each frame from the said high speed data received during time slots assigned to said asynchronous multiplex channel during each time frame;

address storage and control means coupled to said separating means and having stored therein an assignment list which identifies the address relationship between respective pairs of sending and receiving stations which are connected over said sub-multiplex channel, said address storage and control means being responsive to the respective said sending station address information separated by said separating means to produce at its output information as to the addresses of the respective receiving stations to which said sending stations are connected; and outgoing highway selection and control means coupled to both said address storage and control means and said separating means and responsive to select the appropriate outgoing highways in accordance with the said information as to the addresses of the respective receiving stations as received from said address storage and control means, said receiving stations corresponding to the receiving stations identified by said assignment list as the one to which respective ones of said sending stations are connected, said outgoing highway selection and control means acting to store at appropriate outgoing highway storage locations both the said information as to the addresses of said respective receiving stations and the associated said low speed data to be sent therewith as recieved from said separating means, until said storage locations may be read out over said sub-multiplex channel.

3. A method of time division multiplexing information over a communications medium between a plurality of sending stations and a plurality of receiving stations, the said information to be transmitted over said communications medium having data of varying speeds including high speed data and varying low speed data with said high speed data transmitted synchronously and said varying low speed data transmitted asynchronously over sequential time frames, said information being transmitted between sending stations and receiving stations by:

assigning respective specified time slots within said time frames to each of said sending stations having said high speed data to be transmitted to a particular receiving station with the assigned time slots providing a high speed synchronous data channel for said sending stations;

commonly assigning at least one specified time slot within each of said time frames to all sending stations having said low speed data to be transmitted, said at least one specified time slot acting to form a low speed asynchronous sub-multiplex data channel available to any of said sending stations having said low speed data to be transmitted;

subdividing the said at least one specified time slot of said sub-multiplex data channel into at least two parts so that one part thereof is reserved for the transmission of an address for assigning as needed on a frame by frame basis said sub-multiplex data channel to any one of said sending stations having said low speed data to be transmitted and so that another part thereof is reserved for the transmission of the low speed data of the particular one of said sending stations whose address occupies said one part;

said information to be transmitted from said sending stations to said receiving stations by:

scanning each of said sending stations during each of said time frames;

selecting from the scanned information the information from sending stations transmitted over said high speed synchronous channel;

determining the respective receiving station addresses for the information scanned from said synchronous channel on the basis of the known assigned time slots of the sending stations;

selecting from the scanned information the information from sending stations including sending station addresses transmitted over said low speed asynchronous sub-multiplex channel; and determining the respective receiving station addresses for the information scanned from said asynchronous sub-multiplex channel on the basis of the known addresses of the sending stations as selected from said scanned information.

4. The method as set forth in claim 3 wherein in subdividing the said specified time slot of said sub-multiplex data channel into at least two parts, a part therefrom is provided at the beginning thereof for indicating the status of the sub-multiplex data channel as between its free and busy states.

5. The method as set forth in claim 4 wherein said plurality of sending stations and said plurality of receiving stations are each divided into groups with each station in each of said groups sending or receiving high speed data being assigned one of the said respective specified time slots of said high speed synchronous data channel and with each station in each of said groups sending or receiving low speed data being commonly assigned said at least one specified time slot in said low speed asynchronous sub-multiplex data channel.

* * * * *

UNITED STATES PATENT AND TRADEMARK OFFICE

CERTIFICATE OF CORRECTION

PATENT NO. : 3,796,835

DATED : March 12, 1974

INVENTOR(S) : Felix H. Closs, Hans R. Mueller, Erich Port and Harry Rudin, Jr.

It is certified that error appears in the above-identified patent and that said Letters Patent are hereby corrected as shown below:

Cover sheet
Col. 1, line 2, Change "INDUCES" to --INCLUDES--

Specification
Col. 1, line 2, Change "INDUCES" to --INCLUDES--

Col. 3, line 33, Change "rate" to --rates--

Col. 5, line 50, Change "data signalling" to --data and signalling--

Col. 5, line 59, Change "preent" to --present--

Col. 8, line 20, Change numbr" to --number--

Col. 8, line 37, Change "highwaY" to --highway--

Col. 8, line 48, Change "whre" to --where--

Col. 9, line 25, Change "uit" to --unit--

Col. 10, line 40, Change "im" to --in--

Signed and Sealed this

*seventh* Day of *October 1975*

[SEAL]

*Attest:*

RUTH C. MASON
*Attesting Officer*

C. MARSHALL DANN
*Commissioner of Patents and Trademarks*